Jan. 13, 1970  F. REVELL ET AL  3,489,518
CARBON DETERMINATION METHOD AND APPARATUS
Filed Nov. 2, 1966  2 Sheets-Sheet 1

INVENTORS
FRANK REVELL &
FRANKLIN E. STEPHENS
BY Sherman H Barber
their Attorney

United States Patent Office 3,489,518
Patented Jan. 13, 1970

3,489,518
CARBON DETERMINATION METHOD AND
APPARATUS
Frank Revell, Imperial, Pa., and Franklin E. Stephens, Parma, Ohio, assignors to Koppers Company, Inc., a corporation of Delaware
Continuation-in-part of application Ser. No. 408,292, Nov. 2, 1964. This application Nov. 2, 1966, Ser. No. 591,589
Int. Cl. G01n 7/14, 7/00
U.S. Cl. 23—230
12 Claims

ABSTRACT OF THE DISCLOSURE

The pressure differential of a portion of furnace off-gases flowing past a flow obstruction is determined; the pressure differential of a second portion of the gases flowing past a similar, but proportionately smaller, flow obstruction is also determined; the pressure differential of the second gas portion is regulated and maintained at some definite ratio with respect to the first gas portion; the second gas portion is cooled and the pressure, temperature, moisture content, are determined while the oxygen and $CO_2$ content in the second gas is determined; from this data, and other known data, the quantity of carbon in both the off-gases and in the melt is determinable. Apparatus for carrying into practice the method of the invention is described.

---

Figure 1:
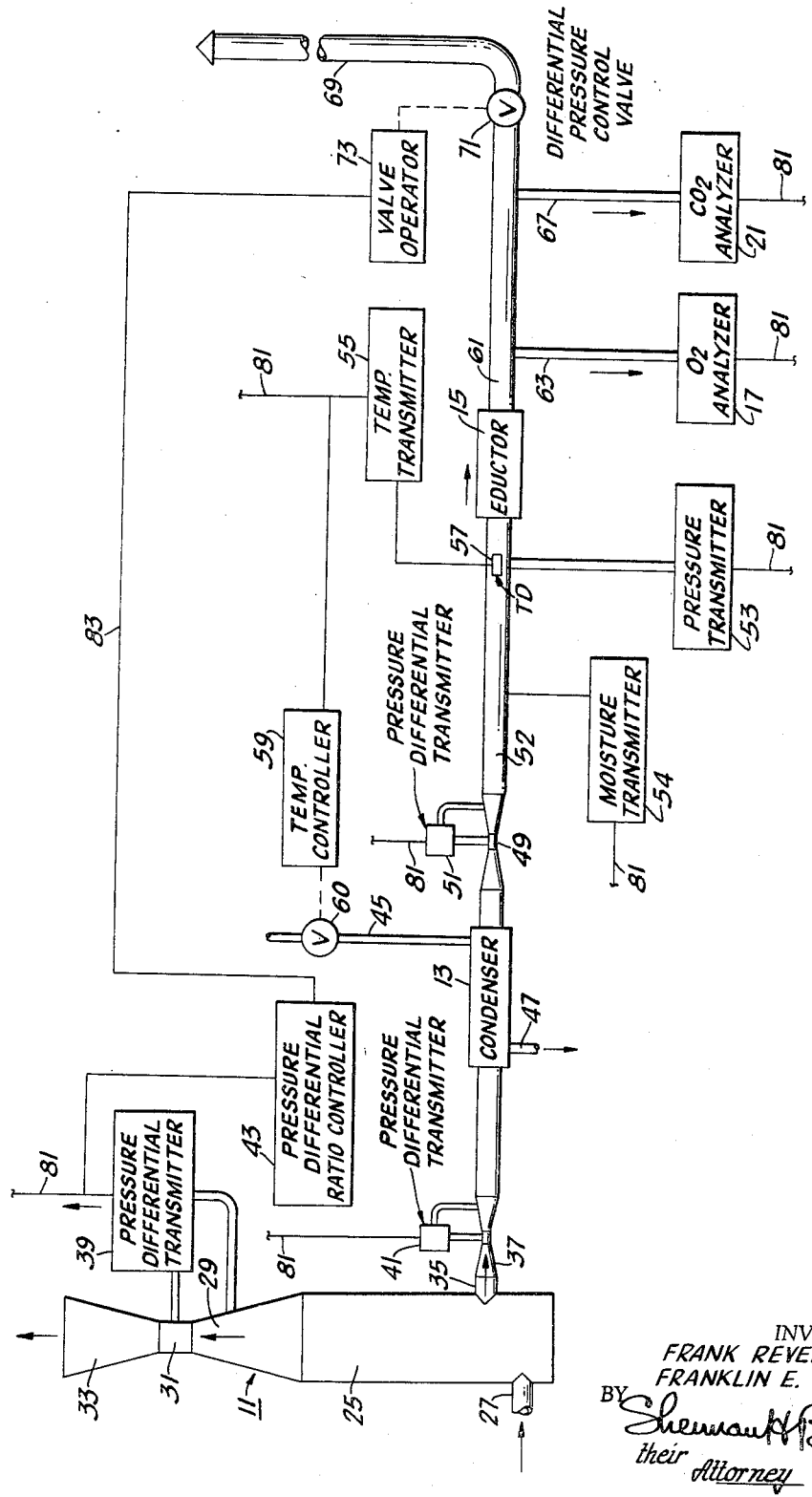

The present invention relates to carbon determination methods and, more particularly, to an improved method and apparatus to determine both the amount of carbon in a melt of steel and FeO in the slag made in a metallurgical furnace, such as a basic oxygen furnace and is a continuation-in-part of application Ser. No. 408,292 filed Nov. 2, 1964 now abandoned.

To make steel in a basic oxygen furnace, scrap metal and hot liquid metal are first introduced into the furance while it is tilted, and then, after it has been righted to a vertical position, an oxygen lance is lowered through the mouth of the furnace until it is within a few feet away from the surface of the molten metal. Oxygen is then introduced into the vessel via the lance and chemical reactions between the oxygen and the molten metal occur immediately. During the combustion process, or carbon blowing period, limestone and other materials are added as required, and the carbon in the melt is consumed until an end point is reached when practically all of the carbon has been consumed.

To control the amount of carbon in steel made in a basic oxygen furnace is generally more difficult than the control of carbon in steel made in other types of furnaces, because there is available no simple, effective way to determine the amount of carbon which is being removed from, or the amount of carbon remaining in, the melt of steel. In other types of furnaces, having comparatively long heat cycles, the melt may be observed and samples may be taken regularly for analysis. But, a melt in a basic oxygen furnace, wherein the heat cycle is relatively short, is not readily observable, not may samples be taken easily. It is necessary to stop the oxygen blowing, turn the vessel down to remove a sample of the melt, reestablish the furnace, and then resume the oxygen blowing. This consumes valuable time and is costly. Heretofore, the amount of carbon removed from a melt has been estimated from knowledge of the initial amount of carbon in the material in the furnace, and the amount of oxygen consumed during the blowing period. It is recognized, however, that differences in lance height, variations in the condition of the furnace vessel, errors in the analysis of materials initially charged into the furnace, variations in the oxygen blowing practice, delay of ignition, and other factors affect the melting process and produce heats which are not satisfactory.

It is usually difficult to determine visually when the desired end point has been reached, and, consequently, unintentional overblowing may occur. This means that, after the melt is tapped, carburizing is necessary. The elimination of this inadvertent overblowing would, of course, provide significant benefits including: a saving in each heat time that could mean more heats per month; a reduction in the amount of oxygen consumed; better temperature control for each heat; additional yield per heat of steel, since overblowing consumes steel; and generally better quality steel.

Attempts have been made to produce a method and apparatus to determine the amount of carbon being removed from, and remaining in, the melt in an oxygen furnace, but so far none has proved to be entirely satisfactory.

This has not been accomplished up to now because of the variable composition of the off-gases after combustion of the same, and, in particular, because of the wide variation in the moisture content, making it practically impossible to obtain an analysis or accurate flow measurement of the gas as in the venting ducts.

In the present invention, a first portion of the basic oxygen furnace off-gases are caused to flow in a first conduit, and the pressure differential of the off-gases, in passing some flow obstruction (such as a baffle, constriction in the conduit, or the like), is determined. A second portion of the off-gases is caused to flow in a second conduit, past a flow obstruction identical in shape but smaller than that in the first conduit, and related by some definite ratio as to size. The pressure differential of this second portion, past the obstruction in the second conduit, is also measured, regulated, and maintained in some definite ratio to the pressure differential of the first portion past the obstruction in the first conduit. The second gases are then cooled, and any condensed water is separated and discarded, after which the pressure, temperature, remaining moisture, and differential pressure through a flow measuring element, are determined.

The respective amounts of oxygen and carbon dioxide in the second gases is determined, and from these and other data, such as, for example, temperature, pressure, moisture, and atmospheric pressure, the quantity of carbon in both the off-gases and the melt is determined by a computer.

It is desirable, for metallurgical reasons, to know also the FeO content of the slag, and this invention makes it possible to determine this. Then, knowing the FeO content of the slag, it is possible to establish control of the melt by manipulation of the height of the lance tip above the bath.

The apparatus of the present invention includes: a first conduit wherein a first portion of the off-gases flows; a second conduit wherein a second portion of the gases flows; apparatus for regulating and maintaining the quantitative flow rate of the second gases proportional to the flow rate of the first gases without the necessity of making any determination of the composition of these gases; apparatus for cooling the second gases to some temperature at which the moisture content is relatively stable; and apparatus for measuring: pressure, temperature, pressure differential through a flow element, moisture, oxygen and carbon dioxide content of the cooled and stabilized second gas, and computer apparatus, capable of receiving the values of oxygen, carbon dioxide, and other related data and, determining therefrom the amount of carbon both in the off-gases, and in the melt of steel.

Figure 2:
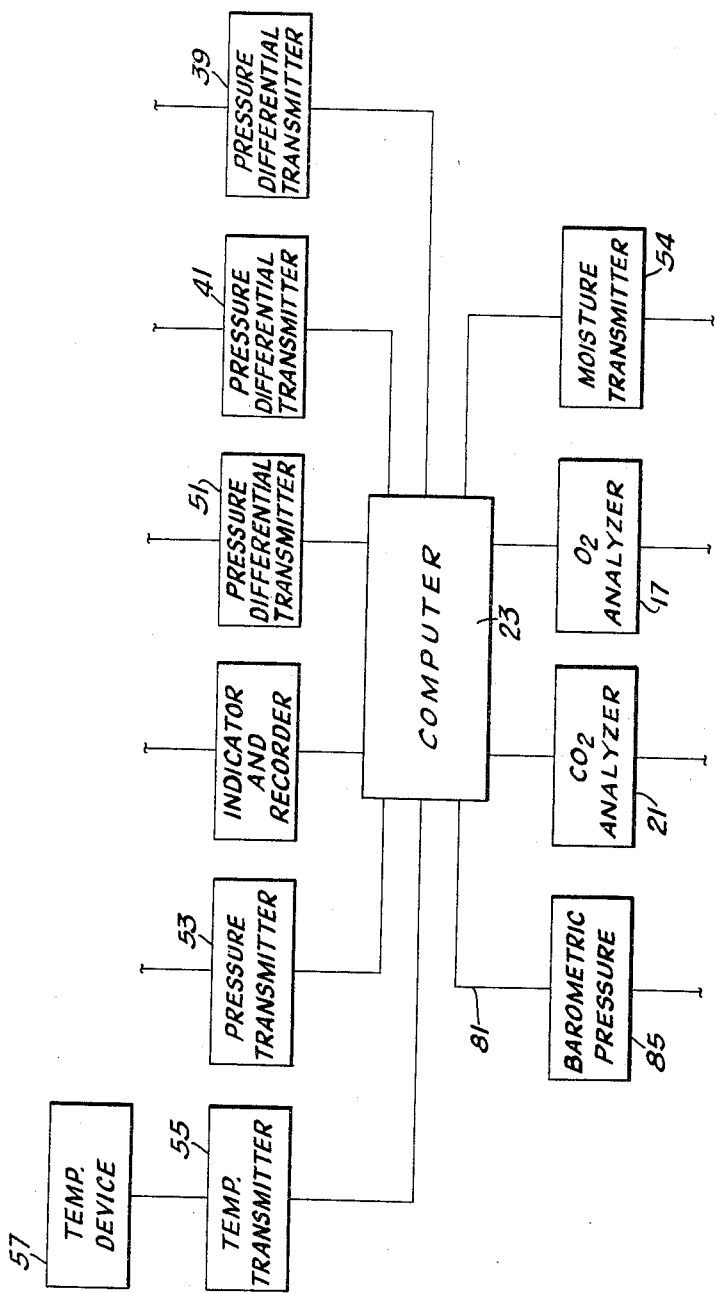

For a further understanding of the present invention and for advantages and features thereof, reference may now be made to the following description taken in conjunction with the accompanying drawings in which:

FIGURE 1 is a schematic flow diagram of one form of apparatus suitable for carrying out the present invention; and FIGURE 2 is a schematic electrical diagram for the apparatus of FIGURE 1.

Referring to the drawings, FIGURE 1 shows the following principal apparatus: a venturi stack 11, a heat exchanger or condenser 13, an eductor 15, an oxygen analyzer 17, a carbon dioxide analyzer 21, and a computer 23. The other ancillary apparatus will be identified hereinafter.

The venturi stack 11 includes a main cylindrical lower body portion 25 having in the side thereof an off-gas inlet conduit and port 27, and a frustoconical upper body portion 29. There is fixed to the smaller end of the frustoconical upper body portion 29 a conventional type of main venturi device 31 which, as may be noticed by referring to FIGURE 1, is connected to another inverted frustoconical gas conduit 33 serving as an outlet conduit for the off-gases. There is also provided in the main cylindrical lower body portion 25, an off-gas outlet conduit and port 35 through which a sample of the off-gases flows and to which is connected a first conventional type smaller venturi 37. In a preferred embodiment of the invention, the main venturi 31 and the first smaller venturi 37 have a fixed area ratio; such an area ratio being, for example, 10,000 to 1. Control of the flow of the gases in the smaller venturi 37 is maintained in the established ratio by regulating the valve 71 in a manner to be described hereinafter. It will be noticed also, that the main venturi 31 and the first smaller venturi 37 are each provided with a conventional type of pressure differential measuring device 39 and transmitter 41, and that each such pressure differential transmitter 41 is connected in circuitry to a common conventional type of pressure differential ratio controller 43.

The outlet end of the first smaller venturi 37 is connected to the inlet end of the conventional type of heat exchanger or condenser 13, which has a fluid inlet conduit 45 and a fluid outlet conduit 47, and a condensate outlet (not shown) for water condensed from the gas sample. Furthermore, the outlet end of the condenser 13 is connected to the inlet end of a second smaller venturi 49, which is similar to the first smaller venturi 37. A pressure differential measuring device and transmitter 51 is conveniently installed adjacent the smaller second venturi 49. The outlet end of the second smaller venturi 49 is connected to the inlet end of the conventional blower or fan type of eductor 15, by means of a conduit 52 disposed therebetween. To the conduit 52, it is convenient to connect a pressure measuring device and transmitter 53, a conventional moisture measuring device and transmitter 54, and a conventional temperature sensing device 57 which is connected to a conventional temperature measuring apparatus and transmitter 55. It will be noticed, that the temperature transmitter 55 is connected in circuitry to a conventional type of temperature controller apparatus 59, and that the temperature controller apparatus may be connected mechanically, or otherwise, to a suitable temperature control valve 60, which is installed in the condenser fluid inlet conduit 45.

It is convenient to provide another conduit 61 which is connected to the outlet end of the eductor 15, and to which a plurality of branch conduits are connected. One such branch conduit 63 is connected to the inlet of the conventional type of oxygen analyzer 17; and another branch conduit 67 is connected to the inlet of the conventional type of carbon dioxide analyzer 21. The main conduit 61 may be conveniently connected also to an exhaust gas stack 69, through a conventional flow control valve 71 that may be readily actuated by a suitable conventional type of valve operator 73. The control valve 71 maintains the fixed differential (10,000 to 1 ratio) across the main orifice 31 and the smaller orifice 37 so that the flow of gases through the smaller orifice 37 will be representative of the flow of gases in the venturi stack 11 at any moment of time.

It will be apparent from FIGURE 2 that the several transmitter, controllers, and analyzers, and recorders may be electrically energized from a suitable power source and connected to the computer apparatus 23, by means of electric wires or cables 81. It should be mentioned that the control valve operator 73 is also electrically connected to the pressure differential ratio controller 43 by means of an electric wire or cable 83, as may be noticed by referring to FIGURE 1.

To understand the operation of the present invention, reference may be made initially to FIGURE 1. The off-gases from a conventional basic oxygen furnace are generally directed, after burning in an excess of air, through a suitable gas cleaning system (not shown) and before being admitted to the venturi stack 11 via the inlet conduit 27. The larger first portion of the furnace off-gases flow through the main venturi portion 31 and the pressure differential therein may be measured by the pressure differential transmitter 39. The smaller second portion of the furnace off-gases emerge from the lower portion of the venturi stack as an analytical side stream, and flow through the outlet conduit 35 and through the first smaller venturi 37. (The pressure differential of the analytical side stream comprised of the second off-gases, may be measured at the first smaller venturi 37.) It was mentioned previously that the pressure differential ratio controller 43 is connected in circuitry to the pressure differential transmitters 39, 41, and that the pressure differential ratio controller 43 is connected in circuitry to the valve operator 73. The purpose of the pressure differential ratio controller 43 and valve operator 73 is to regulate the control valve 71, and to control the flow of the off-gases in the conduit 61. It is apparent that, by properly operating the pressure differential ratio controller 43, the rate of flow of the second off-gases may be maintained proportional to the rate of flow of the first off-gases in the main venturi stack 11, without the necessity of determining either rate of flow.

It is recognized also that the temperature of the second gases is considerably in excess of the temperature of gases which may safely pass through the oxygen and carbon dioxide analytical apparatus 17, and 21 respectively. Moreover, the second gases, of identical composition with the first gases, contain considerable moisture. And so, the second gases pass through the heat exchanger or condenser 13, wherein the gases are dehumidified and cooled to a more suitable temperature. The cooler and dryer second gases, after separation and discard of condensed moisture, emerge from the condenser 13 and pass through the second smaller venturi 49, into the conduit 52. Pressure differential of the second gases through the second venturi 49 may be measured, and the value thereof transmitted to the computer 23 by the transmitter 51. Thereafter, the values of the moisture, pressure, and temperature of the second gases are transmitted to the computer 23 by the respective transmitters 54, 53, and 55.

It will be appreciated, that the energy of the second gases, emerging from the second venturi 49, may be lower than preferred, and so, it is desirable at this point to increase the energy of the second gases. This may be readily accomplished by means of the conventional blower or fan type eductor 15, and the second gases, emerging from the eductor 15, will have sufficient energy to move through the remaining portions of the conduit 61, the several branch conduits 63, 67 and the exhaust stack 69. Samples of the gases may now be urged into the oxygen analyzer 17, via the branch conduit 63, and into the carbon dioxide analyzer 21, via the branch conduit 67. It was mentioned previously that the flow of the second gases in the conduit 61 is so regulated by the control valve 71 that the flow of the second gases is proportional to the flow of the first gases. The values of the quantity of oxygen, and carbon dioxide, as measured by the respective analyzers 17 and 21, are transmitted to the computer 23. Besides these values, and the other values mentioned previously, it is desirable to measure and transmit to the computer the value of the barometric pressure. This is readily accomplished by a conventional barometric apparatus 85, shown schematically in FIGURE 2.

To determine the amount of carbon in the melt at any stage of the blow process, it is necessary first to determine the initial amount of carbon in the charge material, and to transmit this information to the computer 23. Then, having activated the several transmitters, controllers, and analyzers, the carbon blow process may be commenced as mentioned hereinbefore. As the off-gases flow in the manner described, the several units of apparatus transmit information to the computer, which receives the information and immediately determines the amount of carbon in the off-gases and the amount of carbon remaining in the melt, at any particular moment. Thus, the operator or melter will know from the computer the amount of carbon in the melt at any particular moment, and he may control the end point in accordance with the desired carbon content of the steel that is to be produced.

By way of example, the following illustrates typical calculations that the computer 23 referred to herein would be called upon to make.

A sample of off-gases may be directed through the venturi 49 and cooled to about 100° F. The temperature of the sample may be within the range of 95°–105° F. A saturated sample of the gases at 100° F. contains 0.0646 mole of water vapor per mole of total sample gas.

The pressure drop, $P_d$, is measured by the pressure differential transmitter 51; the gage pressure is measured by the pressure transmitter 53; the absolute barometric pressure is measured by the barometer 85; and the temperature, degrees F, is measured by the temperature transmitter 55.

Now, if $N_{N_2}$ represents the molar concentration of nitrogen ($N_2$) in the total gas, and $N_{CO_2}$, $N_{O_2}$, and $N_{H_2O}$ the molar concentrations respectively of $CO_2$, $O_2$ and $H_2O$ in the total gas, then, having determined the values of $N_{CO_2}$, $N_{O_2}$ and $N_{H_2O}$, we find:

$$N_{N_2} = 1 - (N_{CO_2} + N_{O_2} + N_{H_2O}) \quad (1)$$

and the total composition of the sample of the gas is:

$$N_{N_2} + N_{CO_2} + N_{O_2} + N_{H_2O} = 1$$

The total specific gravity at the venturi 49 will be, assuming the specific gravity of air is equal to one:

Sp. gr. $= 1.5208\, N_{CO_2} + 0.6232\, N_{H_2O}$
$\qquad\qquad + 1.1046\, N_{O_2} + 0.9721\, N_{N_2}$ (2)

The factors in each case are the molecular weights of the constituents divided by the average molecular weight of air multiplied by the factors below for their particular deviations from the ideal gas law, under the conditions prevailing in the sample gas ($RT/PV$ corrections).

$CO_2$ 1.00093 (17% at 100° F.)

$H_2O$ 1.002 (Sat. at 100° F.)

$O_2$ 1.002 (15% at 100° F.)

Atmospheric $N_2$ is assumed to be 1.18% argon and 98.82% $N_2$. The flow rate, $F_{total}$, of the sample gas through the venturi 49 is then:

$$F_{total} = K\sqrt{P_d \times (P_g + P_b) \times \frac{1}{T+460} \times \frac{1}{\text{sp. gr.}}} \quad (3)$$

where $P_d$ = pressure differential
$P_g$ = gauge pressure
$P_b$ = barometric pressure
$T$ = temperature in ° F.

Factor K is chosen to give F in standard cubic feet per second at 14.696 p.s.i.a. and 70° F., for the metering element used.

The quantity of $CO_2$ lost by solution in the condensate from the sample gas depends on the quantity of condensate at any given time, and the quantity of condensate at any given time depends in turn on the quantity of spray water used to cool the gas to a given temperature (say 500° F.), after complete combustion of all carbon monoxide from the vessel to $CO_2$. Consequently, the amount of condensate at any given time is roughly dependent on the concentration of $CO_2$ present at that time. Using this relationship and the known solubility distribution of $CO_2$ in water, correction for the loss of $CO_2$ in the condensate may be made with sufficient accuracy by the formula:

$$N_{CO_2}\text{ corrected} = N_{CO_2} \times \left(1.0005 - \frac{0.000018}{N_{CO_2}}\right) \quad (4)$$

When $N_{CO_2}$ is less than 0.036, this correction becomes insignificant and is not used.

The dry constituents passing out of the stack are:

$$N_{CO_2}(\text{corrected}) \times F_{total} \times 10^4 = F_{CO_2} \quad (5)$$
$$N_{O_2} \times F_{total} \times 10^4 = F_{O_2} \quad (6)$$
$$N_{N_2} \times F_{total} \times 10^4 = F_{N_2} \quad (7)$$

The factor $10^4$ representing the ratio of the unstabilized gas sample to the total gas in the stack. $F_{CO_2}$, $F_{O_2}$ and $F_{N_2}$ are then the instantaneous mass flow rates of each of these separate constituents in the gas passing out of the stack. Considering the integrated flows, for time, T, the following is evident:

$$\sum_0^T F_{CO_2} = Q_{CO_2} \text{ at time } T \quad (8)$$

where $F_{CO_2}$ = the instantaneous mass flow rates of $CO_2$ at each successive time interval, $Q_{CO_2}$ = the total $CO_2$ from the start of the blowing period up to time T.

Similarly, for the other constituents:

$$\sum_0^T F_{O_2} = Q_{O_2} \text{ at time } T \quad (9)$$

$$\sum_0^T F_{N_2} = Q_{N_2} \text{ at time } T \quad (10)$$

The total, $Q_{CO_2}$ (T) is compensated for the time lag in sampling and making an analysis, by adding to it a quantity derived from the rate of carbon, elimination from the bath, associated with each successive level of carbon remaining in the bath.

The sources of carbon in the off-gases are:

C in the bath
$CO_2$ from the limestone
$CO_2$ in the air ($0.0005 \times Q_{N_2}$)
C in the lining, which is related as a time function.

Then, at time T, the remaining carbon in the bath, $C_T$, in pounds is:

$$C_T = C_B - 0.03096(Q_{CO_2} - 0.0005 Q_{N_2})_T + 0.12 = CACO_3 + C_{Lin.T} \quad (11)$$

where:

$C_B$ is the quantity of carbon in the bath initially;
$C_{Lin.}$ is the quantity of carbon in the vessel lining at time T; and
the other terms relate to the quantity of carbon in the air and limestone.

The correction for carbon evolved from the limestone, which is shown as $0.12 \times C_aCO_3$, should be multiplied by a supplementary factor based upon an analysis of the limestone. For each shipment of limestone received and used, a new factor will be determined and supplied to the computer 23 which will apply the correction factor to the equation.

The correction for carbon evolved from the lining:

$C_{Lin.T}$ is derived from the carbon content of the lining and the time rate of loss of the lining.
Then:

The present $C = 100 C_T / wt.$ bath  (12)

where

Wt. bath = charge weight $-Si - Fe$ in slag $-(C_C - C_T)$ and where the charge wt. = weight of hot metal + weight of the scrap.

In addition to the calculation of remaining bath-carbon at time T, as described herein, it is possible also to use the information derived from the gas analysis by the apparatus and method of the invention, for the calculation of the amount of FeO in the slag at time T, and for the calculation of the temperature of the bath and slag at time T. This may be done by use of the following methods and the results obtained from the computer 23.

For the calculation of FeO in the slag, it is necessary to know the distribution of lance oxygen between the oxides emitted as gas, and the oxides remaining in the vessel. Now, the pounds of lance oxygen ($O_2$) held in the vessel at time T, $W_{O_2(T)}$, is found from the relation:

$$W_{O_2(T)} = 0.08275(Q_{Lance\ O_2(T)} - [Q_{CO_2} + Q_{O_2} - 0.2655\ Q_{N_2}](T)) - 0.00026\ Q_{CO_2(T)} \quad (13)$$

where the term in the brackets consists of integrated totals of $CO_2$, $O_2$, and $N_2$ at time T from the gas analysis, and the last term equals the oxygen in the dust at time T, assuming that the rate of dust emission is proportional to the rate of carbon elimination, and the total dust produced is 50 lbs. per ingot ton of steel.

Then, the pounds of FeO in the slag at time T, $W_{FeO(T)}$, is:

$$W_{FeO(T)} = \frac{71.85}{16}\left(W_{O_2(T)} - \frac{32}{28.06}(Si_B - Si_T) - \frac{16}{54.93}(Mn_B - Mn_T) - \frac{80}{154.9}(P_B - P_T) - \frac{32}{32.07}(S_B - S_T) - \frac{2250}{C_T}\right) \quad (14)$$

where the several terms represent lance oxygen used at time T in oxidizing silicon (Si), manganese (Mn), phosphorus (P), and sulfur (S). The term $$\frac{2250}{C_T}$$

is the weight of dissolved oxygen for a bath weight of 300,000 lbs., where the percent O in solution is equal to $$\frac{0.0025}{\text{percent } C}$$

derived from the percent C remaining in solution.

The method for calculation of the temperature of the bath and slag at time T is identical with the method used for calculation of the final temperature of the bath and slag for the finished heat, when making the initial charge calculation, with the exception that the integrated heats of reaction for carbon elimination and for generation of FeO are the heats for carbon eliminated and FeO generated at time T, instead of at the final conditions. Similarly, the heat losses, consisting, for example, of heat radiated from the vessel (essentially a time function), heat carried out of the vessel in the gases evolved, and heat carried out in generating the dust, are used as accrued to time T, instead of at the final conditions.

It is recognized that a calculated temperature of the bath and slag can be accurate, and of value to the operator, only after the scrap has been completely melted, and the process is beginning to approach the end point. For this reason, and for simplicity in the calculation, the assumption is made that the entire charge of scrap, hot metal and fluxes, is in its final molten form throughout the entire process. The result of this assumption is that the calculated temperature is purely hypothetical throughout the earlier stages of the process, but as the scrap melts and the process begins approaching the end point, the calculated temperature will approach the actual temperature, and will be very nearly the same as the actual temperature when the end point is reached. A few other assumptions, of similar effect, are indicated in what follows:

The heat effects of the reactions, which are to be accrued to time T, are calculated by applying the known heats of reaction to the following quantities, derived from the gas analysis:

$C_B - C_T =$ lbs. carbon burned to CO at time T  (15)

$0.116(Q_{CO_2(T)} + 2Q_{O_2(T)} - 0.5304\ Q_{N_2(T)}) =$ lbs. of CO burned to $CO_2$ by lance oxygen at time T  (16)

$0.778\ W_{FeO(T)} =$ lbs. of Fe burned to FeO in the slag at time T  (17)

$0.000603\ Q_{CO_2}(T) =$ lbs. of Fe burned in generating dust at time T  (18)

Other known heat effects necessary for the temperature calculation are exemplified by, but not necessarily limited to, the following:

(1) Sensible heat of charged materials, including oxygen;

(2) Heats of reaction of elements oxidized, other than C and Fe; for example Si, Mn, P and S. (All these reactions are assumed to have reached end point conditions at the beginning of the process);

(3) Heat of mixing of the oxide products in the slag (assumed to have reached end point conditions as above);

(4) Heats of dissociation of materials such as limestone, (also assumed to reach completion at the beginning, or immediately upon addition); and (5) Heat loss to surroundings, a time function.

Now, the total heat contained in the bath and slag at time T can be calculated by summation of all the above heat effects, and other similar ones not mentioned:

$H_{Total(T)} = \Sigma H_{In\ Charge} + \Sigma H_{Gained(T)} - H_{Lost(T)}$  (19)

where H represents heat.

The heat in the bath and in the slag can be represented in linear form, over some suitable range of end point temperatures (such as 2750° F. to 3000° F., for example), with sufficient accuracy by:

$H_{Bath} = W_{Bath}(A + B\theta)$  (20)

$H_{Slag} = W_{Slag}(D + E\theta)$  (21)

where W represents weight, $\theta$ represents temperature, and A, B, D and E are constants in the linear heat content equations for bath and slag.

Now, $H_{Total(T)} = H_{Bath(T)} + H_{Slag(T)}$  (22)

So, $H_{Total(T)} = W_{Bath}(A + B\theta_{(T)}) + W_{Slag}(D + E\theta_{(T)})$  (23)

The only unknown in Equation 23 is $\theta_{(T)}$, the temperature of the bath and slag at time T, which is thus calculated:

$$\theta_{(T)} = \frac{H_{Total} - (W_{Bath}A + W_{Slag}D)}{W_{Bath}B + W_{Slag}E} \quad (24)$$

It should be evident from the examples given herein that the method and apparatus described will provide information whereby a computer can calculate the most useful and pertinent parameter for the operator, in controlling the process as the end point is being approached.

While the invention has been described herein with a certain degree of particularity, it is understood that the present disclosure has been made only as an example, and that various modifications and changes may be made within the scope of the invention as defined by the appended claims.

What is claimed is:

1. The method of determining continuously the amount of carbon remaining in a bath of molten steel in a lined vessel during decarburization thereof by blowing oxygen onto said molten metal under conditions of complete combustion of formed CO to $CO_2$ in the exhaust gases, comprising the steps of:
   (a) flowing the major portion of the exhaust gases in a first conduit;
   (b) flowing the remaining minor portion of the exhaust gases in a second conduit;
   (c) measuring continuously the flow differential pressure of the major portion of exhaust gases per unit of time in said first conduit;
   (d) measuring continuously the flow differential pressure of the minor portion of exhaust gases per unit of time in said second conduit;
   (e) regulating and maintaining the flow differential pressure of the minor portion of the gases in said second conduit in a preselected proportional ratio to the flow differential pressure of the major portion of the gases in said first conduit;
   (f) cooling said second gases;
   (g) determining the amount of oxygen and carbon dioxide in said flowing second gases per unit of time;
   (h) continuously determining the total carbon content in the flowing second gases over the period of time from the commencement of the oxygen blowing period to a selected moment of time during said blowing period;
   (i) multiplying said total amount of carbon in said second gases by said proportional ratio between the flow differential pressures of gases in said first and second conduits to obtain the amount of carbon removed from the metal bath during said period of time; and
   (j) subtracting the amount of carbon removed from the metal bath from the known carbon content of said molten metal at the commencement of said oxygen blowing period to obtain an indication of the amount of carbon remaining in the molten metal at said selected moment of time.

2. The method of claim 1 including the steps:
   (a) determining the time rate loss of carbon from the lining during the oxygen blowing period; and
   (b) correcting the indicated amount of carbon remaining in the molten metal by the amount of carbon lost from the vessel lining.

3. The method of continuously determining the amount of carbon remaining in a bath of molten steel in a lined vessel during decarburization thereof by blowing oxygen against said molten metal under conditions of complete combustion of formed CO to $CO_2$ in the exhaust gases comprising the steps:
   (a) flowing the major portion of the exhaust gases in a first conduit;
   (b) flowing the remaining minor portion of the exhaust gases in a second conduit;
   (c) continuously measuring the flow differential pressure of the major first portion of the vessel off-gases in said first conduit;
   (d) continuously measuring the flow differential pressure of the minor second portion of the vessel off-gases in said second conduit;
   (e) regulating and maintaining the flow differential pressures of the first and second gases at a constant preselected ratio;
   (f) continuously measuring the pressure, temperature and moisture content of said cooled second gases;
   (g) continuously measuring the instantaneous mass flow rate of the flow of oxygen, carbon dioxide and nitrogen in said cooled second gases;
   (h) determining the initial amount of carbon in the bath of molten metal;
   (i) determining the amount of carbon evolved from the limestone portion of the charge material;
   (j) determining the time rate loss of carbon from the lining material of said lined vessel;
   (k) electronically integrating said continuous measurements relative to said second gases and multiplying the integrated sum by the ratio of the flow differential pressure of gases in said first conduit to the flow differential pressure of gases in said first conduit to the flow differential pressure of gases in said second conduit to determine the amount of carbon removed from the bath; and
   (l) subtracting the carbon content in said gases from the initial carbon content of the bath of molten metal to obtain an indication of the amount of carbon remaining in the molten metal at any moment of time during the oxygen blowing period.

4. The method of continuously determining the amount of carbon removed from a bath of molten steel in a lined vessel during decarburization thereof by blowing oxygen against said molten metal under conditions of complete combustion of CO to $CO_2$ in the exhaust gases comprising the steps:
   (a) flowing the major portion of the exhaust gases in a first conduit;
   (b) flowing the remaining minor portion of the exhaust gases in a second conduit;
   (c) continuously measuring the flow differential pressure of the major first portion of the vessel off-gases in said first conduit;
   (d) continuously measuring the flow differential pressure of the minor second portion of the vessel off-gases in said second conduit;
   (e) regulating and maintaining the flow differential pressures of the first and second gases at a constant preselected ratio;
   (f) continuously measuring the pressure, temperature and moisture content of said cooled flowing second gases;
   (g) continuously measuring the instantaneous mass flow rate of the flow of oxygen, carbon dioxide and nitrogen in said cooled flowing second gases;
   (h) continuously electronically integrating said instantaneous measurements to obtain the total amount of carbon in the cooled flowing second gases over a selected period of time from the commencement of the blowing period; and
   (i) multiplying the integrated total amount of carbon removed from the bath in said second gases by the constant preselected ratio to obtain the total amount of carbon removed from the bath within the said interval of time.

5. The method of continuously determining the amount of carbon removed from a bath of molten steel in a lined vessel during decarburization thereof by blowing oxygen against said molten metal under conditions of complete combustion of CO to $CO_2$ in the exhaust gases comprising the steps:
   (a) diverting a minor portion of the carbon containing exhaust gases evolving from said vessel during the oxygen blowing period into a conduit;
   (b) regulating and maintaining the flow rate of the minor portion of said gases at a constant ratio to the flow rate of the major other portion of said gases;
   (c) analyzing the minor portion of said gases for continuously determining the instantaneous flow rate of carbon in said minor portion of said gases;
   (d) electronically integrating the instantaneous flow rates of carbon in said minor portion of said gases to determine the total amount of carbon in said minor gases over a period of time from the commencement of the oxygen blowing period; and
   (e) multiplying the total amount of carbon in said minor gases by said constant flow ratio to determine the total amount of carbon removed from said bath during said period of time.

6. The method of claim 5 including:
(a) determining the initial carbon content of the metal bath; and
(b) determining the amount of carbon remaining in said bath by subtracting the instantaneous total amount of carbon removed from said bath from the total initial amount of carbon in said bath.

7. An arrangement for continuously determining the amount of carbon removed from a bath of molten steel in a lined vessel during decarburization of the steel by blowing oxygen again said molten steel thereby generating exhaust gases comprising:
(a) a first conduit having a first Venturi wherein flows the major first portion of the carbon containing gases exhausting from said vessel during the oxygen blowing period;
(b) a second conduit have a second Venturi sized proportionately to said first Venturi wherein flows a fixed proportionate minor second portion of said exhaust gases;
(c) analyzing apparatus for continuously determining the instantaneous amount of carbon in said flowing second gases; and
(d) electronic integrating apparatus associated with said analyzing apparatus for deriving from said analyzing apparatus and from said fixed flow ratio the amount of carbon removed from said molten bath over a period of time from the commencement of the oxygen blowing period.

8. An arrangement for continuously determining the amount of carbon removed from a bath of molten steel in a lined vessel during decarburization of the steel by blowing oxygen against said molten steel and thereby generating exhaust gases comprising:
(a) a first conduit having a first Venturi wherein flows the major first portion of the carbon containing gases exhausting from said vessel during the oxygen blowing period;
(b) a second conduit having a second Venturi sized proportionately to said first Venturi wherein flows a fixed proportionate minor second portion of said exhaust gases;
(c) analyzing means for continuously determining the instantaneous amount of carbon in the minor second gas portion;
(d) means for determining the pressure, temperature and moisture content of the gases comprising said minor second portion;
(e) means for determining the amount of carbon lost from the furnace lining to said exhaust gases; and
(f) electronic computer means cooperating with said analyzing means and determining means for deriving from the measured amount of carbon flowing in the minor second gases, the pressure, temperature and moisture content of said minor second gases, the carbon lost to the exhaust gases and from the fixed flow ratio of the first gases to the second gases, the total amount of carbon removed from said bath over a period of time from the commencement of and within the oxygen blowing period.

9. An arrangement for continuously determining the amount of carbon remaining in a bath of molten steel in a lined vessel during decarburization of the steel by blowing oxygen against said molten steel and thereby generating exhaust gases comprising:
(a) a first conduit having a first Venturi wherein flows the major first portion of the carbon containing exhaust gases from said vessel during the oxygen blowing period;
(b) a second conduit having a second Venturi sized proportionately to said first Venturi wherein flows a fixed proportionate minor second portion of said exhaust gases;
(c) analyzing apparatus for continuously determining the instantaneous amount of carbon in said flowing second gases;
(d) means for determining the pressure, temperature and moisture content of the gases comprising said minor second portion;
(e) means for determining the amount of carbon lost from the furnace lining to said exhaust gases;
(f) means for continuously determining the instantaneous amount of nitrogen in the minor second gas portion;
(g) means for determining the total initial amount of carbon in the molten bath at the commencement of the oxygen blowing period;
(h) means for determining the amount of carbon given up to the gases by the furnace charge material including limestone; and
(i) electronic computer means cooperating with said analyzing and determining means for deriving from the data produced therefrom and from the fixed fow ratio of the first gas portion to the second gas portion, the amount of carbon remaining in said metal bath at any moment of time from the beginning of and within the oxygen blowing period in accordance with the relation $$C_T = C_B - 0.03096(Q_{CO_2} - 0.0005 Q_{N_2})_T + 0.12 CaCo_3 + C_{Lin\ T}$$

where $C_B$ is the initial amount of carbon in the bath of molten metal, $Q_{CO_2}$ and $Q_{N_2}$ are the integrated total amounts of $CO_2$ and $N_2$ present in the exhaust gases from the vessel from the start of the blowing period up to any moment of time T thereafter during the blowing period, 0.12 $CaCo_3$ is the amount of carbon evolved from the limestone portion of the charge material, and $C_{Lin\ T}$ is the amount of carbon lost by the vessel lining material to the exhaust gases from the vessel.

10. The method of claim 3 and further including the method for continually determining the amount of FeO in the slag on said bath of molten steel, comprising the steps:
(a) determining continually the amount of lance oxygen ($O_2$) held in the vessel at time T;
(b) determining continually the respective amounts of lance oxygen up to time T used in oxidizing the silicon (Si), manganese (Mn), phosphorous (P) and sulphur (S) in said molten steel;
(c) determining continually the amount of dissolved oxygen at time T in a bath of molten steel having an assumed weight of 300,000 pounds; and
(d) electronically integrating the respective determinations herein to obtain the weight of FeO in the slag at time T from the expression $$W_{FeO(T)} = \frac{71.85}{16}\left(W_{O2(T)} - \frac{32}{28.06}(Si_B - Si_T) - \frac{16}{54.93}(Mn_B - Mn_T) - \frac{80}{154.9}(P_B - P_T) - \frac{32}{32.07}(S_B - S_T)_B - \frac{2250}{C_T}\right)$$

11. The method of claim 10 wherein:
(a) the weight of lance-oxygen ($O_2$) held in the vessel at time T is derived from the expression:

$$W_{O_2} = 0.08275(Q_{Lance\ O_2(T)} - [Q_{CO_2} + Q_{O_2} - 0.2655 Q_{N_2}]_{(T)}) - 0.00026 Q_{CO_2(T)}$$

where, the parenthetical term is the integrated totals of the amount of $CO_2$, $O_2$ and $N_2$ determined from analysis of the off-gases from said vessel, and the last term is the oxygen in the dust at time T.

12. The method of claim 3 and further including the method for determining the temperature of the metal in the bath, and of the slag, at time T when all of the metal in the vessel is molten, comprising the steps:
(a) continually determining:

(i) the weight of carbon (C) burned to CO,
(ii) the weight of CO burned to $CO_2$ by the lance oxygen,
(iii) the weight of Fe burned to FeO in the slag,
(iv) the weight of Fe burned in generating dust given off from the vessel,
(v) the sensible heat of the charged solid materials,
(vi) the sensible heat of the oxygen blown into the vessel,
(vii) the heat of reaction of elements that are oxidized other than carbon (C) and iron (Fe),
(viii) the heat of mixing of the oxide products in the slag,
(ix) the heat of dissociation of limestone charged into the vessel, and
(x) the heat lost to the surrounding ambient;

(b) continuously integrating the foregoing continuous determinations to determine the total heat in the molten bath and slag at time T from the relation $$H_{Total(T)} = H_{In\ Charge} + H_{Gained(T)} - H_{Lost(T)}$$

where H is the heat in B.t.u.'s;

(c) continually determining
(i) the heat in the molten bath from the relation:

$$H_{Bath} = W_{Bath}(A + B\theta),$$

and
(ii) the heat in the slag from the relation $H_{Slag} = W_{Slag}(D + E\theta)$, where $W_{Bath}$ is the weight of molten metal in the bath, $W_{Slag}$ is the weight of the slag, $\theta$ is the temperature, and A, B, D and E are constants in the linear heat content equations for both the molten metal and the slag; and (d) continually determining from the foregoing determinations the temperature of the bath and slag at time T from the expression $$\theta_{(T)} = \frac{H_{Total} - (W_{Bath}A + W_{Slag}D)}{W_{Bath}B + W_{Slag}E}$$

where
$H_{Total} = H_{Bath(T)} + H_{Slag(T)}$
$W_{Bath}$ = Weight of molten metal in the bath and
$W_{Slag}$ = Weight of slag

References Cited

UNITED STATES PATENTS

| | | | |
|---|---|---|---|
| 3,181,343 | 5/1965 | Fillon | 73—23 XR |
| 3,329,495 | 7/1967 | Ohta et al. | 73—23 XR |

OTHER REFERENCES

Walker et al., "Principles of Chemical Engineering" (1927), pp. 23–24.

McCabe and Smith, "Unit Operations of Chemical Engineering," 1956, p. 9.

MORRIS O. WOLK, Primary Examiner

R. E. SERWIN, Assistant Examiner

U.S. Cl. X.R.

23—232, 253, 254; 73—23; 75—60

FO-1050
(5/69)

UNITED STATES PATENT OFFICE
CERTIFICATE OF CORRECTION

Patent No. 3,489,518          Dated January 13, 1970

Inventor(s) Frank Revell and Franklin E. Stephens

It is certified that error appears in the above-identified patent and that said Letters Patent are hereby corrected as shown below:

Col. 7, line 7, change "present", to ---percent---

Claim 9, line 21, change "fow", to ---flow---

Claim 10, line 56, change "$W_{02}(T)$", to ---$W_{O_2}(T)$---

SIGNED AND
SEALED
FEB 2 1971

FEB. 2, 1971

(SEAL)
Attest:

Edward M. Fletcher, Jr.
Attesting Officer

WILLIAM E. SCHUYLER, JR.
Commissioner of Patents